(No Model.)
D. W. HOSHALL.
HARROW TOOTH FASTENER.
No. 584,738. Patented June 15, 1897.
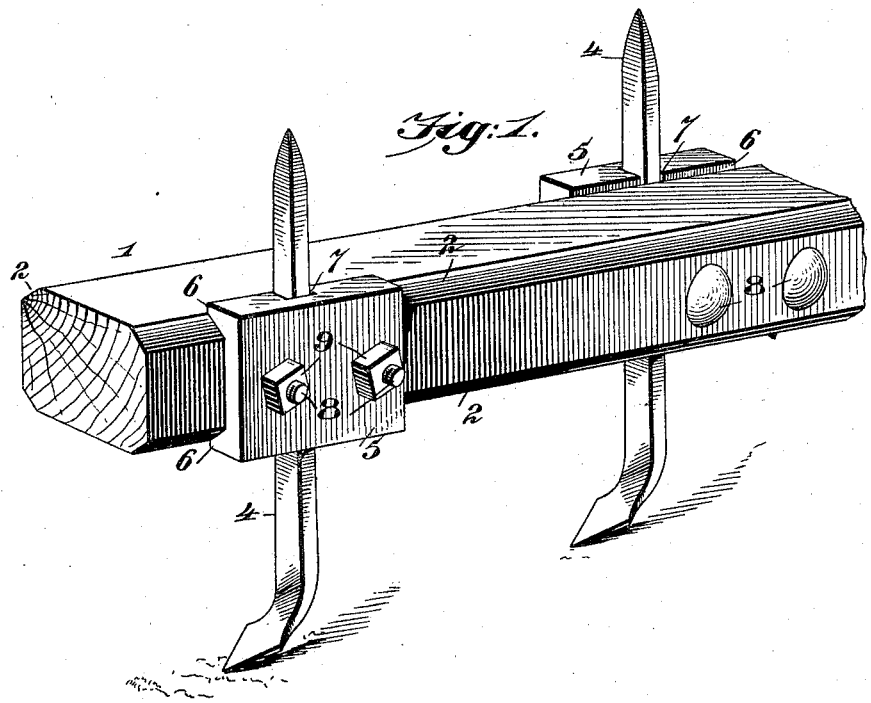
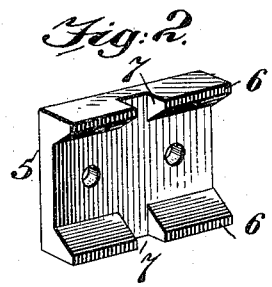
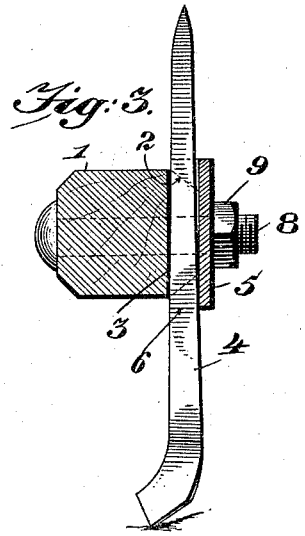
Witnesses
Inventor
David W. Hoshall
By his Attorneys,

UNITED STATES PATENT OFFICE.

DAVID W. HOSHALL, OF LITTLE ROCK, ARKANSAS.

HARROW-TOOTH FASTENER.

SPECIFICATION forming part of Letters Patent No. 584,738, dated June 15, 1897.

Application filed February 27, 1897. Serial No. 625,356. (No model.)

*To all whom it may concern:*

Be it known that I, DAVID W. HOSHALL, a citizen of the United States, residing at Little Rock, in the county of Pulaski and State of Arkansas, have invented a new and useful Harrow-Tooth Fastener, of which the following is a specification.

My invention relates to tooth-fastening devices designed especially for use in connection with harrows and cultivators; and the object in view is to provide a clamp so constructed as to combine with the tooth-bar of a harrow or cultivator frame to form a substantial seat capable of holding a reversible tooth and to provide a clamp adapted to strengthen the tooth-bar against splitting.

Further objects and advantages of this invention will appear in the following description, and the novel features thereof will be particularly pointed out in the appended claim.

In the drawings, Figure 1 is a perspective view of a portion of a tooth-bar fitted with tooth-clamps constructed in accordance with my invention, reversible cultivator and harrow teeth being shown in engagement therewith. Fig. 2 is a detail view in perspective of the clamp-plate reversed to show the interior construction thereof. Fig. 3 is a sectional view of the clamp, showing a tooth arranged in the operative position therein.

Similar numerals of reference indicate corresponding parts in all the figures of the drawings.

1 designates the tooth-bar, which is preferably provided with beveled or chamfered edges 2 and is channeled or grooved vertically at intervals to form seats 3 for the cultivator-teeth 4. The clamp comprises a plate 5, provided at its upper and lower edges with inwardly-extending beveled flanges 6 to overlap the contiguous beveled or chamfered angles of the tooth-bar, said flanges being provided with registering notches 7, which register with the seat 3 of the tooth-bar and receive the tooth. It will be seen that the beveled faces of the flange 6 on the clamp-plate, coacting with the beveled edges 2 of the tooth-bar, serve to compress the latter and thereby prevent splitting when the tooth-bar is subjected to strain, as when the teeth thereof encounter a resisting object. The seat 3 is preferably of a depth equal to the chamfered or beveled portion of the tooth-bar, and the projection of the flanges 6 beyond the inner surface of the clamp-plate is preferably approximately equal to the depth of said seat and beveled portions of the tooth-bar to avoid unnecessary angles and enable the clamp-plate to firmly engage the tooth-bar. The clamp also includes bolts 8, extending through the tooth-bar horizontally and also through the clamp-plate and engaged by nuts 9.

Having described my invention, what I claim is—

A tooth-clamp adapted for use in connection with a tooth-bar having beveled or chamfered corners and a vertical tooth-seat, said clamp comprising a plate adapted to close said tooth-seat and provided with upper and lower inwardly-extending flanges having beveled inner sides to engage the beveled or chamfered corners of the tooth-bar, and provided in said flanges with notches registering with the tooth-seat, and means, as bolts, for securing the clamp-plate in its operative position, substantially as specified.

In testimony that I claim the foregoing as my own I have hereto affixed my signature in the presence of two witnesses.

DAVID W. HOSHALL.

Witnesses:
D. L. BOURLAND,
W. B. DAVIS.